US012749895B2

(12) United States Patent
Bauer

(10) Patent No.: US 12,749,895 B2
(45) Date of Patent: Sep. 29, 2026

(54) METHOD AND SYSTEM FOR DISTRIBUTING ELECTRICITY OVER LINES

(71) Applicant: Alberto Bauer, Al Menara (AE)

(72) Inventor: Alberto Bauer, Al Menara (AE)

( * ) Notice: Subject to any disclaimer, the term of this patent is extended or adjusted under 35 U.S.C. 154(b) by 330 days.

(21) Appl. No.: 18/688,775

(22) PCT Filed: Sep. 15, 2022

(86) PCT No.: PCT/IT2022/000048
§ 371 (c)(1),
(2) Date: Mar. 3, 2024

(87) PCT Pub. No.: WO2023/047426
PCT Pub. Date: Mar. 30, 2023

(65) Prior Publication Data

US 2024/0372364 A1 Nov. 7, 2024

(30) Foreign Application Priority Data

Sep. 24, 2021 (IT) ........................ 102021000024532

(51) Int. Cl.
*H02J 3/06* (2026.01)
*H02J 103/35* (2026.01)

(52) U.S. Cl.
CPC ............. *H02J 3/06* (2013.01); *H02J 2103/35* (2026.01)

(58) Field of Classification Search
CPC ........... H02J 3/06; H02J 2103/35; H02J 13/12
See application file for complete search history.

(56) References Cited

U.S. PATENT DOCUMENTS

| | | | | |
|---|---|---|---|---|
| 11,749,992 | B2 | 9/2023 | Metcalfe | |
| 2003/0120440 | A1* | 6/2003 | Zima | H02H 7/22 702/57 |
| 2014/0008982 | A1* | 1/2014 | Powell | G01D 4/002 307/31 |
| 2017/0097363 | A1 | 4/2017 | Saffitz | |
| 2018/0097363 | A1* | 4/2018 | Blood | H02J 3/0014 |
| 2020/0067314 | A1* | 2/2020 | Metcalfe | H02J 3/16 |
| 2020/0313423 | A1* | 10/2020 | Pan | H02H 7/268 |
| 2021/0111561 | A1* | 4/2021 | Blair | H02J 3/12 |
| 2023/0120440 | A1 | 4/2023 | Prybell | |

FOREIGN PATENT DOCUMENTS

| | | | | |
|---|---|---|---|---|
| CA | 3120689 | A1 * | 4/2020 | H02J 13/333 |

OTHER PUBLICATIONS

Pal Anamitra; "Online calibration of voltage transformers . . . " IEEETransactions; Feb. 2016.

* cited by examiner

*Primary Examiner* — Mong-Shune Chung
(74) *Attorney, Agent, or Firm* — Andrew Wilford

(57) ABSTRACT

A method relating to a system for a line for the distribution of electrical energy comprises: a first distribution line (L1.MT); a first secondary substation (CS.100) comprising a first current transformer (116), a measurement voltage transformer (120) and a first PMU (151); and a second secondary substation (CS.200) comprising a second conductor (210), a first voltage reduction apparatus (230) and a second PMU (251), in which said method provides for carrying out operations in order to perform a calibration in relation to the first voltage reduction device (230) located in the second secondary substation (CS.200). A relative system.

12 Claims, 2 Drawing Sheets

METHOD AND SYSTEM FOR DISTRIBUTING ELECTRICITY OVER LINES

CROSS REFERENCE TO RELATED APPLICATIONS

This application is the US-national stage of PCT application PCT/IT2022/000048 filed 15 Sep. 2022 and claiming the priority of Italian patent application 102021000024532 itself filed 24 Sep. 2021.

TECHNICAL FIELD

The present invention regards the sector of lines for the distribution of electrical energy and, more particularly, the sector of diagnostics for said lines.

BACKGROUND OF THE INVENTION

Currently, methods and systems relating to lines for the distribution of electrical energy are known.

Said methods and systems have a series of drawbacks.

A first drawback is due to the fact that they do not allow to execute an accurate diagnostics in relation to the line as a whole and/or in relation to pieces of the same line and/or in relation to one or more of the devices connected to it, such as, for example, performing a calibration of the voltage reduction devices during the operation of the line, that is, with the line energized.

A second drawback is due to the fact that they require the use in the line of multiple devices and multiple apparatuses with consequent set up and maintenance costs.

A third drawback is due to the fact that they do not allow to modify an existing line system, in which it is not possible to carry out the diagnostics of the devices, in a line system in which it is possible to carry out the diagnostics of the pre-existing line and/or the diagnostics of the related apparatuses already present, such as, for example, obtaining a line in which it is possible to perform the calibration of the voltage reduction apparatuses, without, for example, having to install measurement voltage transformers in each of the individual secondary substations.

DESCRIPTION OF THE INVENTION

The purpose of the present invention is therefore to solve the aforementioned drawbacks.

The invention, which is characterized by the claims, solves the problem of creating a METHOD relating to a system for an electric power distribution line comprising: a first distribution line in medium voltage; a first secondary substation; at least one second secondary substation; n h said first secondary substation comprises: a first medium voltage conductor as input conductor in said first secondary substation and connected to the aforementioned first distribution line; a first current transformer connected to the first line of medium voltage at a point between the first secondary substation and the second secondary substation and able to detect the current along the aforementioned first line of medium voltage; a measuring voltage transformer connected to said first conductor and able to measure the voltage entering the first secondary substation; and a first PMU connected to the output of said first current transformer and to the output of said first measurement voltage transformer; n which said second secondary substation comprises: a second medium voltage conductor as input conductor in said second secondary substation and connected to the aforementioned first distribution line; a first voltage reducing apparatus connected to said second medium voltage inlet conductor; and a second PMU connected to the outlet of said second voltage reduction apparatus located in said second secondary substation; in which said system comprises: a receiving_processing unit suitable for receiving and processing the data transmitted by the first PMU located in the first secondary substation and the data transmitted by the second PMU located in the second secondary substation; in which said method is characterized by the fact that it comprises the following operations: m.1*a*)_to detect by the first PMU located in the first secondary substation and at certain instants of time the values of the current along the first distribution line detected by the first current transformer located in the same first secondary substation and transmitting the relative data with relative time references to the receiving-processing unit; m.1*b*)_to detect by the first PMU located in the first secondary substation and at certain instants of time which are the same instants of time of the previous point m.1*a*) the voltage values at the output of the transformer measuring voltage located in the same first secondary substation and transmitting the relative data with relative time references to the receiving_processing unit; m.1*c*)_to detect by the second PMU located in the second secondary substation and in certain instants of time which are the same instants of time of the previous point m.1*a*) the voltage values at the output of said first voltage reduction apparatus located in said second secondary substation and transmitting the relative data with relative time references to the receiving-processing unit; m.1*d*)_to identify and to by means of said receiving_processing unit among the data received at least a first instant in time in which the value of the current relative to the first line detected by means of the current transformer located in the first secondary substation is lower than a first predetermined threshold value; m.1*e*)_to process by means of said receiving_processing unit one or more data received from the same receiving_processing unit and regarding said first instant of time in order to perform a calibration in relation to the first voltage reduction apparatus located in the second secondary substation.

The invention, which is characterized by the claims, solves the problem of creating a SYSTEM relating to a line for the distribution of electrical energy comprising a first distribution line in medium voltage, a first secondary substation and at least one second secondary substation; in which said system is characterized by the fact that said first secondary substation comprises: a first medium voltage conductor as input conductor in said first secondary substation and connected to the aforementioned first distribution line; a first current transformer connected to the first line of medium voltage in a zone between the first secondary substation and the second secondary substation and able to detect the current along the aforementioned first line of medium voltage; a measuring voltage transformer connected to said first conductor and able to measure the voltage entering the first secondary substation; and a first PMU connected to the output of said first current transformer and to the output of said first measurement voltage transformer; by the fact that said second secondary substation comprises: a second medium voltage conductor as input conductor in said second secondary substation and connected to the aforementioned first distribution line; a first voltage reducing apparatus connected to said second medium voltage inlet conductor; and a second PMU connected to the outlet of said second voltage reduction apparatus located in said second secondary substation; by the fact to comprises a receiving_processing unit able to receive and process the data transmitted by the first PMU located in the first secondary substation and the data transmitted by the second PMU located in the second secondary substation; and by the fact that said system is configured to perform the following operations: s.1a)_by the first PMU located in the first secondary substation to detect at certain instants of time the values of the current along the first distribution line detected by the first current transformer located in the same first secondary substation and transmitting the relative data with relative time references to the receiving-processing unit; s.1b)_by the first PMU located in the first secondary substation to detect at certain instants of time which are the same instants of time of the previous point s.1a) the voltage values at the output of the transformer measuring voltage located in the same first secondary substation and transmitting the relative data with relative time references to the receiving_processing unit; s.1c)_by the second PMU located in the second secondary substation to detect in certain instants of time which are the same instants of time of the previous point s.1a) the voltage values at the output of said first voltage reduction apparatus located in said second secondary substation and transmitting the relative data with relative time references to the receiving-processing unit; s.1d)_by means of said receiving_processing unit to identify and to select among the data received at least a first instant in time in which the value of the current relative to the first line detected by means of the current transformer located in the first secondary substation is lower than a first predetermined threshold value; s.1e)__by means of said receiving_processing unit to process one or more data received from the same receiving_processing unit and regarding said first instant of time in order to perform a calibration in relation to the first voltage reduction apparatus located in the second secondary substation.

BRIEF DESCRIPTION OF THE DRAWINGS

Further characteristics and advantages of the present invention will be more evident from the following description of some of its preferred practical embodiments, given here purely by way of non-limiting example, made with reference to the figures of the attached drawings in which.

PREFERRED MANNER OF IMPLEMENTING THE INVENTION

Premises

With reference to the description of the method and of the system below, the devices called "PMU", ref. 151 and 251, are known devices whose technical name in English, not yet clear as a translation into Italian, would be "Phasor_Measurement_Units" (acronym PMU).

These PMU are devices that using a common time source for synchronization and measure and/or detect voltage phasors data/values and/or measure and/or detect current data/phasors and/or other parameters, to then transmit the data/values relating to the measurements and/or surveys performed, in technical terms the "phasors", for example relating to the voltage and/or current at nominal grid frequency (for example 50 Hz or 60 Hz), with associated date and time, with a very high temporal resolution, up to 120 measurements per second and with a temporal resolution of the order of tens of nanoseconds.

In this context, in relation to the protection conferred by the present invention, it means that in relation to the said one or more "PMU", this unit can also be replaced with other means able to perform the same function with respect to the function that will be described in the description, without departing from the inventive concepts protected by the present invention.

Always with reference to the descriptions below relating to the method and the system, and always in relation to the protection conferred by this invention, it is understood that in relation to the device "receiving_processing unit", ref. UR, said device may also be replaced by other means capable of performing the same function as specified in the description, without departing from the inventive concepts protected by the present invention.

Description of the Method—Exemplificative Embodiment

Figure 2:
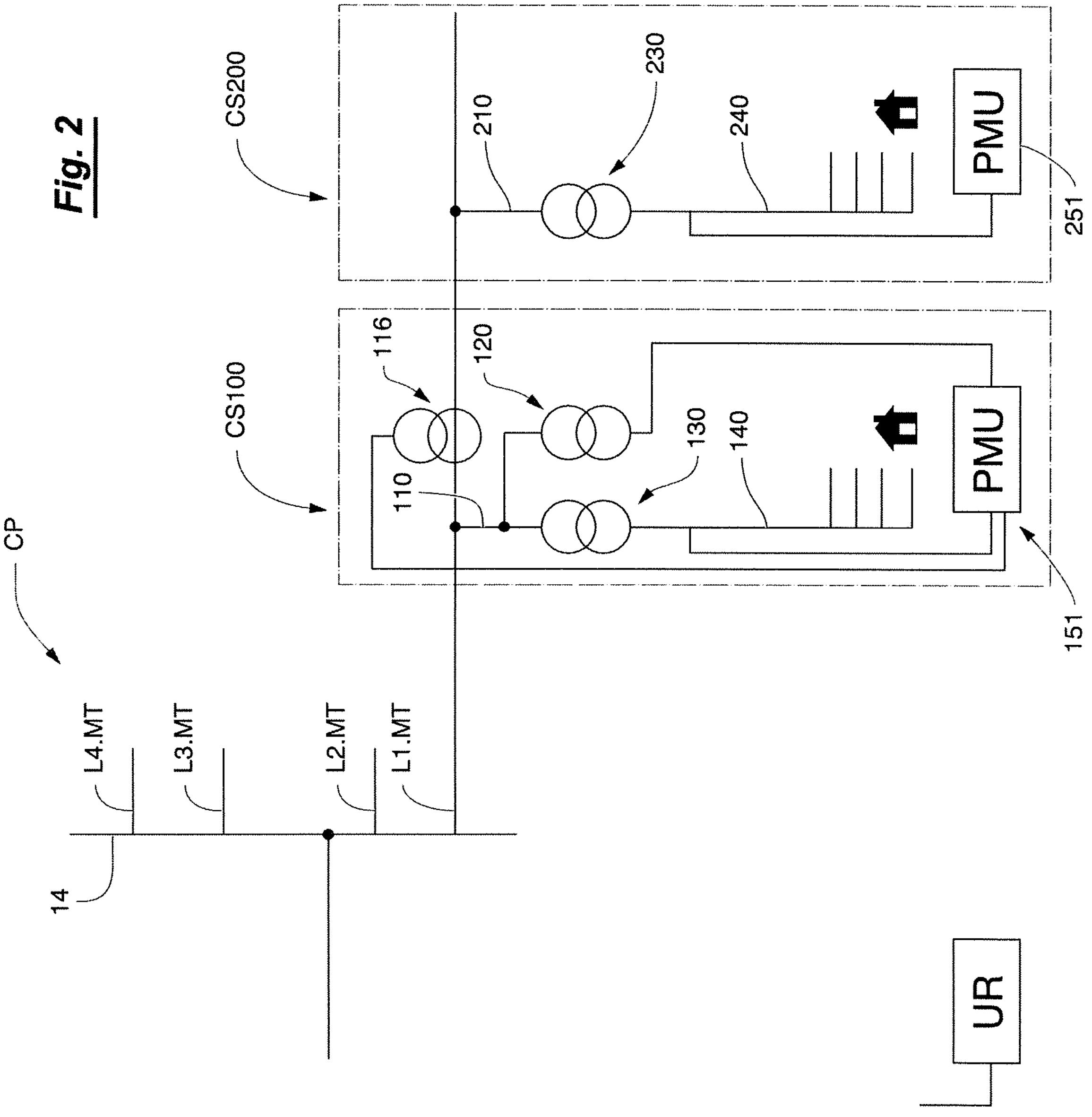
FIG. 2 schematically illustrates the method and the line system object of the present invention.

With reference to FIG. 2, the method object of the present invention is preferably applied in a line system for the distribution of electrical energy comprising: a first medium voltage distribution line L1.MT; a first secondary substation CS.100; and at least a second secondary substation CS.200.

With reference to FIG. 2, the first distribution line L1.MT can be connected, for example, to a medium voltage bar 14, to which other distribution lines, L2.MT, L3.MT, L4.MT, etc., can also be connected.

With reference to the first line for the distribution of electricity L1.MT, one or more secondary substations can be connected to it, such as, for example, as illustrated in FIG. 2 without limiting intentions, a first secondary substation CS.100 and a second secondary substation CS.200, it is also specified that the system can also comprise other secondary substations located downstream along the same distribution line L1.MT.

With reference to FIG. 2, the first secondary substation CS.100 comprises: a first medium voltage input conductor 110 in said first secondary substation CS.100 connected to the aforementioned first distribution line L1.MT; a first current transformer 116 connected to the first medium voltage line L1.MT in an zone between the first secondary substation CS.100 and the second secondary substation CS.200, more particularly in the section of line L1.MT between the first secondary substation CS.100 and the second secondary substation CS.200, and able to detect the current along the aforementioned first medium voltage line L1.MT; a measurement voltage transformer 120 connected to said first conductor 110 and adapted to measure the input voltage into the first secondary substation CS.100; a first PMU 151 connected to the output of said first current transformer 116 and to the output of said first measurement voltage transformer 120.

With reference to FIG. 2, the second primary substation CS.200 comprises: a second medium voltage input conductor 210 located in said second secondary substation CS.200 and connected to the aforementioned first distribution line L1.MT; a first voltage reduction apparatus 230 connected to said second medium voltage input conductor 210; and a second PMU 251 connected to the output of said second voltage reduction apparatus 230 located in said second secondary substation CS.200.

Again with reference to FIG. 2, said system also comprises a receiving_processing unit UR adapted to receive and process the data transmitted by the first PMU 151 located in the first secondary substation CS.100 and the data transmitted by the second PMU 251 located in the second secondary substation CS.200.

With reference to the system described above, the method object of the present invention comprises the following operations: m.1*a*)_to detect by the first PMU 151 located in the first secondary substation CS.100 and at certain instants of time the values of the current along the first distribution line L1.MT detected by the first current transformer 116 located in the same first secondary substation CS.100, more particularly the current values of the line section L1.MT comprised between the first secondary cabin CS.100 and the second secondary cabin CS.200, and transmitting the relative data with relative time references to the receiving-processing unit UR; m.1*b*)_to detect by the first PMU 151 located in the first secondary substation CS.100 and at certain instants of time which are the same instants of time of the previous point m.1*a*) the voltage values at the output of the transformer measuring voltage 120 located in the same first secondary substation CS.100 and transmitting the relative data with relative time references to the receiving_processing unit UR; m.1*c*)_to detect by the second PMU 251 located in the second secondary substation CS.200 and in certain instants of time which are the same instants of time of the previous point m.1*a*) the voltage values at the output of said first voltage reduction apparatus 230 located in said second secondary substation CS.200 and transmitting the relative data with relative time references to the receiving-processing unit UR; m.1*d*)__ to identify and to select by means of said receiving_processing unit UR among the data received at least a first instant in time in which the value of the current relative to the first line L1.MT detected by means of the current transformer 116 located in the first secondary substation CS.100 is lower than a first predetermined threshold value; m.1*e*)_to process by means of said receiving_processing unit UR one or more data received from the same receiving_processing unit UR and regarding said first instant of time in order to perform a calibration in relation to the first voltage reduction apparatus 230 located in the second secondary substation CS.200.

Again referring to the system described above, the method object of the present invention may preferably also include the following operations: m.2*a*)_to store by means of the receiving_processing unit UR the data transmitted by the first PMU 151 and by the second PMU 251; m.2*b*)_to identify and to select by means of said receiving_processing unit UR among the data received at least a first instant of time in which the value of the current relative to the first line L1.MT detected by the current transformer 116 located in the first secondary substation CS.100 is lower than a predetermined first threshold value; m.2*c*)_to identify by means of said receiving_processing unit UR among the received data the data concerning the output voltage with respect to the measurement voltage transformer 120 located in the first secondary substation CS.100 in the same first instant time identified and selected in point m.2*b*) above; n.2*d*)_to identify by means of said receiving_processing unit UR, among the received data, the data concerning the output voltage with respect to the first voltage reduction apparatus 230 located in the second secondary substation CS.200 in the same first instant of time identified and selected in point m.2*b*) above; m2*e*)_to process by the receiving_processing unit UR the data identified by the previous point m.2*c*) and point m.2*d*) relating said first instant of time in order to perform a calibration in relation to the first voltage reduction apparatus 230 located in the second secondary substation CS.200.

Again referring to the system described above, the method object of the present invention can optionally also comprise the following operation: m.3*a*)_to perform by means of the receiving_processing unit UR a comparison between at least a first value concerning the outlet voltage from said second voltage reduction apparatus 230 located in the second secondary substation CS.200 with at least a second value relating to the outlet voltage of said measurement voltage transformer 120 located in the first secondary substation CS.200, in which said first value and said second value are related to the same instant of time, as for example a first instant of time as specified above, in which the value of the current detected by the first current transformer 116 is lower than a pre-fixed first threshold value.

With reference to the first predetermined threshold value mentioned in this description, see in particular but not exclusively the above points m.1*d*) and m.2*b*), it is preferably equal to zero, or, always preferably, equal to a value such as to have an effect due to the voltage drop on the first line due to the current flowing in the first line, having a negligible amount. This current value can for example be determined on the basis of the length of the first line L1.MT.

System Description Exemplificative Embodiment

With reference to FIG. 2, the system object of the present invention comprises: a first medium voltage distribution line L1.MT; a first secondary substation CS.100; and at least a second secondary substation CS.200.

With reference to FIG. 2, the first distribution line L1.MT can be connected, for example, to a medium voltage bar 14, to which other distribution lines, L2.MT, L3.MT, L4.MT, etc., can also be connected.

With reference to the first line L1.MT for the distribution of electricity, one or more secondary substations can be connected to it, such as, for example, as illustrated in FIG. 2 without limiting intentions, a first secondary substation CS.100 and a second secondary substation CS.200, but other secondary sub-station located downstream along the same distribution line L1.MT can be provided and connected to the same first line L1.MT for the distribution of electricity.

With reference to FIG. 2, the first secondary substation CS.100 comprises: a first medium voltage input conductor 110 located in said first secondary substation CS.100 and connected to the aforementioned first distribution line L1.MT; a first current transformer 116 connected to the first medium voltage line L1.MT in an zone between the first secondary substation CS.100 and the second secondary substation CS.200 and able to detect the current along the aforementioned first line L1.MT of medium voltage; a measurement voltage transformer 120 connected to said first conductor 110 and able to measure the input voltage into the first secondary substation CS.100; a first PMU 151 connected to the output of said first current transformer 116 and to the output of said first measurement voltage transformer 120.

With reference to FIG. 2, the second primary substation CS.200 comprises: a second medium voltage input conductor 210 in said second secondary substation CS.200 connected to the aforementioned first distribution line L1.MT; a first voltage reduction apparatus 230 connected to said second medium voltage input conductor 210; a second PMU connected to the output of said second voltage reduction apparatus 230 and located in said second secondary substation CS.200.

Again with reference to FIG. 2, said system also comprises a receiving_processing unit UR able to receive and process the data transmitted by the first PMU 151 located in the first secondary substation CS.100 and the data transmitted by the second PMU 251 located in the second secondary substation CS.200.

With reference to the system described above, it can be configured to perform the following operations: s.1*a*)_by the first PMU 151 located in the first secondary substation CS.100 to detect at certain instants of time the values of the current along the first distribution line L1.MT detected by the first current transformer 116 located in the same first secondary substation CS.100, more particularly in the section of line L1.MT between the first secondary substation CS.100 and the second secondary substation CS.200, and transmitting the relative data with relative time references to the receiving-processing unit UR; s.1*b*)_by the first PMU 151 located in the first secondary substation CS.100 to detect at certain instants of time which are the same instants of time of the previous point s.1*a*) the voltage values at the output of the transformer measuring voltage 120 located in the same first secondary substation CS.100 and transmitting the relative data with relative time references to the receiving_processing unit UR; s.1*c*)_by the second PMU 251 located in the second secondary substation CS.200 to detect in certain instants of time which are the same instants of time of the previous point s.1*a*) the voltage values at the output of said first voltage reduction apparatus 230 located in said second secondary substation CS.200 and transmitting the relative data with relative time references to the receiving-processing unit UR; s.1*d*)_by means of said receiving_processing unit UR to identify and to select among the data received at least a first instant in time in which the value of the current relative to the first line L1.MT detected by means of the current transformer 116 located in the first secondary substation CS.100 is lower than a first predetermined threshold value; s.1*e*)_by means of said receiving_processing unit UR to process one or more data received from the same receiving_processing unit UR and regarding said first instant of time in order to perform a calibration in relation to the first voltage reduction apparatus 230 located in the second secondary substation CS.200.

Again with reference to the system described above, if desired, it can be configured to perform also the following operations: s.2*a*)_by means of the receiving_processing unit UR storing the data transmitted by the first PMU 151 and from the second PMU 251; s.2*b*) by means of said receiving_processing unit UR identify and select from the received data at least a first instant of time in which the current value relating to the first line L1.MT detected by the current transformer 116 located in the first secondary substation CS.100 is lower than a predetermined first threshold value; s.2*c*)_by means of said receiving_processing unit UR identify among the received data the data concerning the output voltage with respect to the measurement voltage transformer 120 located in the first secondary substation CS.100 in the same first instant of time identified and selected in above point s.2*b*); s.2*d*) by means of said receiving_processing unit UR identify among the received data the data concerning the output voltage with respect to the first voltage reduction apparatus 230 located in the second secondary substation CS.200 in the same first instant of time identified and selected in above point s.2*b*); s.2*n*)_by means of the receiving_processing unit UR to process the data identified in the above point s.2*c*) and point s.2*d*) regarding said first instant of time in order to perform a calibration in relation to the first voltage reduction apparatus 230 located in the second secondary substation CS.200.

Always the system described above can also be configured to perform the following operation: m3*a*)_to perform by means of the receiving_processing unit UR a comparison between at least a first value concerning the outlet voltage from said second voltage reduction apparatus 230 located in the second secondary substation CS.200 with at least a second value relating to the outlet voltage of said measurement voltage transformer 120 located in the first secondary substation CS.200, in which said first value and said second value are related to the same instant of time, as for example, a first instant in time as specified above, in which the value of the current detected by the first current transformer 116 is lower than a given first predetermined threshold value. With reference to the first predetermined threshold value mentioned in the present description, see in particular points s.1*d*) and s.2*b*), it is preferably equal to zero, or, always preferably, equal to a value such as to have an effect due to the voltage drop on the first line due to the current flowing in the first line itself, having a negligible amount. This current value can for example be determined on the basis of the length of the first line L1.MT.

First Threshold Value in Relation to the Method and to the System

With reference to the above description and examples, in relation to the calibration of one or more voltage reduction apparatuses 120/130/230/320, preferably, the method and/or system described above is particularly effective when the value of the current relative to the first line L1.MT detected by means of the current transformer 16 located in the primary substation CP is lower than a given first predetermined threshold value and, preferably, when said first threshold value is equal to zero (optimal value).

With reference to said first threshold value of the current not to be exceeded detected by the current transformer 116, by way of non-limiting example, it can be determined in correlation with the components that are applied along the line L1.MT and, in any case, this first threshold value must have a measure such as to have an effect due to the voltage drop on the line L1.MT due to the effect of the current flowing in the line L1.MT having a negligible amount.

According to a first form of determination, if the value of said voltage detected by means of the precision TV 120 is equal to 100 kV effective Volt and if in the first secondary substation CS.100 there is a voltage reduction apparatus 130 as a capacitive divider type having the following characteristics, rated voltage 10 kV and accuracy class 0.5 (i.e. maximum ratio error 0.5% of the rated voltage and maximum phase error equal to 0.6 crad in the range 80%-120% of the rated voltage-values in accordance with the reference standard IEC 61869-1), said first threshold value of the current that not to be exceeded will be such as not to cause a voltage drop along the line not exceeding a fraction of the ratio error associated with accuracy class 0.5, i.e. 0.5% of 10 kV=50V rms. It is common among calibration laboratories to consider this fraction of the ratio error variable between ⅓ and ⅕ of the accuracy class, that is, in the example cited, between 0.1% and 0.2% which, in absolute value, corresponds at an interval between 10V and 20V.

Therefore, the drop along the line caused by the current must not exceed, for example, 20V. If, according to the tables of the characteristics of the medium voltage cables used on the market, a series resistance of the cable of 0.2 ohm/km is assumed, with reference to 10 km of length the current must be less than 10 A in order not to exceed 20V of drop.

In this context, this first predetermined threshold value is preferably a value such as to have an effect due to the voltage drop on the first line L1.MT having an entity equal to or less than ⅓ of the ratio error associated with the accuracy class of a voltage reduction apparatus, for example 130, to be calibrated.

By means of the method and/or system object of the present invention it is possible to perform a calibration in relation to one or more voltage reduction apparatuses located in a secondary substation or in other secondary substations, solving the above mentioned problems.

Figure 1:
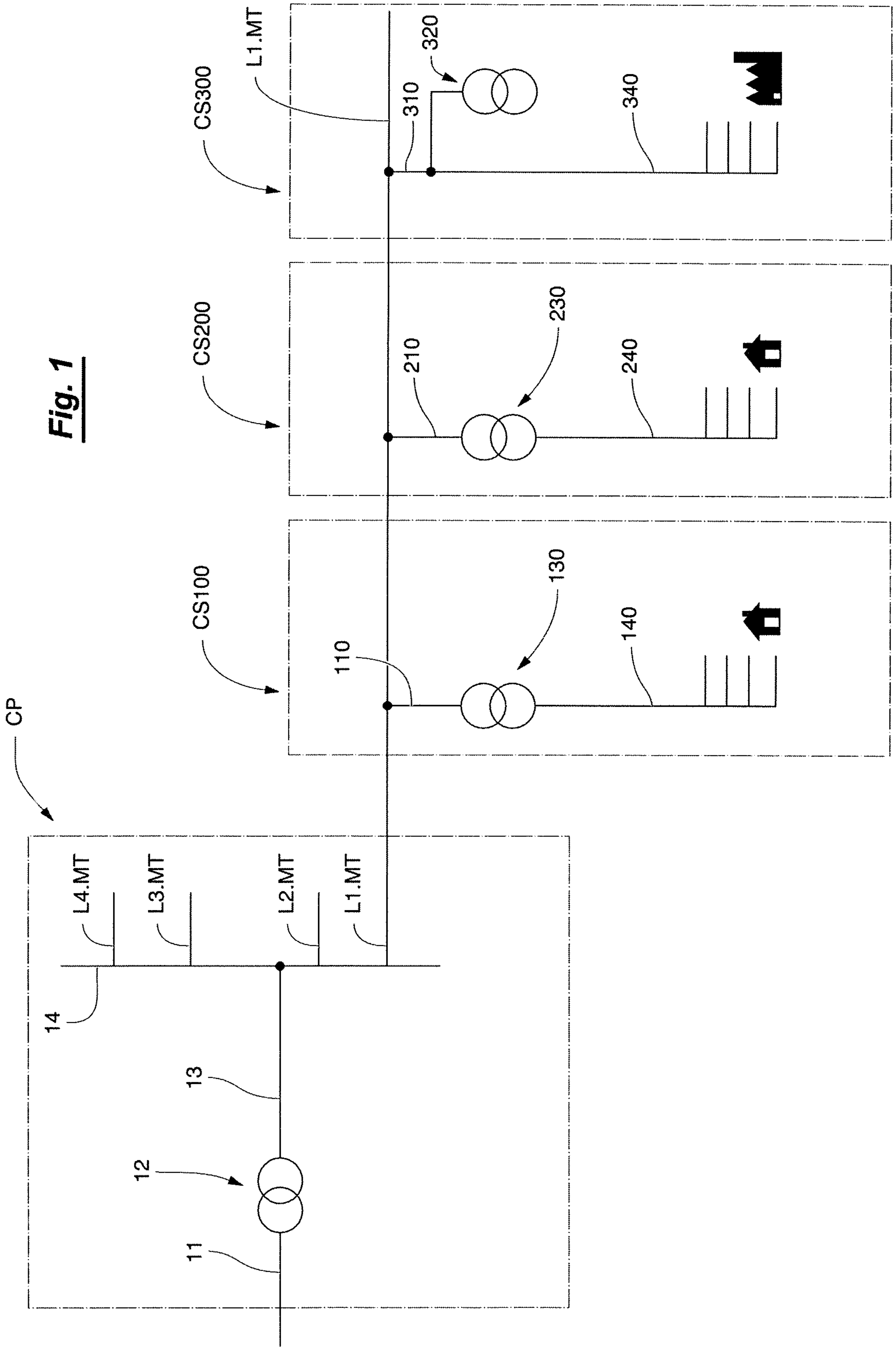
FIG. 1 schematically illustrates a possible pre-existing line system for the distribution of electrical energy.

Furthermore, again by means of the method and/or system object of the present invention, it is possible to modify existing grid systems, such as for example the systems illustrated in FIG. 1, in which it is not possible to carry out diagnostics of the devices, in grid systems in which it is possible to carry out the diagnostics of the devices, through the execution of no expensive works about cost for the execution time, as they require the insertion of a few components, as well as no expensive works, as it is not required to modify the pre-existing system, and also no expensive as components to be added, solving the above problems.

The descriptions of the above method and of the above system are given by way of example only and not by way of limitation and, therefore, it is clear that said method and said system may be subject to any changes or variations suggested by the practice and their implement or use and, in any event, within the scope of the following claims, in which this claims form an additional and/or complementary part for this description.

The invention claimed is:

1. A method of operating a system for distributing electricity, the system comprising:

a first distribution line of medium voltage;

a first secondary substation; and at least one second secondary substation, the first secondary substation having a first medium-voltage conductor as input conductor in the first secondary substation and connected to the first distribution line;

a first current transformer having an output, connected to the first distribution line of medium voltage in a zone between the first secondary substation and the second secondary substation, and able to detect current along the first distribution line of medium voltage;

a first voltage-measuring transformer having an output, connected to the first medium-voltage conductor, and able to measure voltage entering the first secondary substation; and a first phasor-measurement unit connected to the output of the first current transformer and to the output of the first voltage-measuring transformer;

the second secondary substation having a second medium-voltage input conductor in the second secondary substation and connected to the first distribution line;

a first voltage-reducing apparatus connected to the second medium-voltage input conductor;

a second phasor-measurement unit connected to an outlet of the first voltage-reducing apparatus located in the second secondary substation;

the system further comprising a receiving_processing unit suitable for receiving and processing data transmitted by the first phasor-measurement unit in the first secondary substation and data transmitted by the second phasor-measurement unit in the second secondary substation the method comprising the steps of:

1a) detecting with the first phasor-measurement unit in the first secondary substation and at certain instants of time values of current along the first distribution line detected by the first current transformer in the same first secondary substation and transmitting relative data with relative time references to the receiving-processing unit;

1b) detecting with the first phasor-measurement unit in the first secondary substation and at certain instants of time which are the same instants of time of a previous point voltage values at the output of the first voltage-measuring transformer in the same first secondary substation and transmitting relative data with relative time references to the receiving_processing unit;

1c) detecting with the second phasor-measurement unit in the second secondary substation and in certain instants of time which are the same instants of time of a previous point voltage values at an output of the first voltage-reducing apparatus in the second secondary substation and transmitting relative data with relative time references to the receiving-processing unit;

1d) identifying and selecting with the receiving_processing unit among data received at least a first instant in time in which a value of current relative to the first distribution line detected by the first current transformer in the first secondary substation is lower than a first predetermined threshold value;

1e) processing with the receiving_processing unit one or more data received from the same receiving_processing unit and regarding the first instant of time in order to perform a calibration in relation to the first voltage-reducing apparatus in the second secondary substation.

2. The method according to claim 1, further comprising the steps of:

2a) storing with the receiving_processing unit data transmitted by the first phasor-measurement unit and by the second phasor-measurement unit;

2b) identifying and selecting with the receiving_processing unit among data received at least a first instant of time in which a value of current relative to the first distribution line detected by the first current transformer in the first secondary substation is lower than a predetermined first threshold value;

2c) identifying with the receiving_processing unit among the received data concerning an output voltage with respect to the first voltage-measuring transformer in the first secondary substation in the same first instant time identified and selected in step 2b);

2d) identifying with the receiving_processing unit, among the received data, data concerning the output voltage with respect to the first voltage-reducing apparatus in the second secondary substation in the same first instant of time identified and selected in step 2b);

2e) processing with the receiving_processing unit the previous data identified in steps 2c and 2d relating the first instant of time in order to perform a calibration in relation to the first voltage reducing apparatus in the second secondary substation.

3. The method according to claim 1, further comprising the step of:

the receiving processing unit comparing at least a first value concerning an outlet voltage from the first voltage-reducing apparatus in the second secondary substation with at least a second value relating to an outlet voltage of the measurement first voltage-measuring transformer in the first secondary substation, the first value and the second value being related to the same instant of time.

4. The method according to claim 1, wherein the first predetermined threshold value is equal to zero.

5. The method according to claim 1, wherein the first predetermined threshold value is a value having a negligible effect due to voltage drop on the first distribution line.

6. The method according to claim 1, wherein the first predetermined threshold value is preferably a value having an effect due to voltage drop on the first distribution line having a value equal to or less than ⅓ of a ratio error associated with an accuracy class of a voltage-reducing apparatus to be calibrated.

7. A system for a network for distributing electricity, the system comprising:

a first distribution line of medium voltage;

a first secondary substation; and at least one second secondary substation, the first secondary substation having a first medium-voltage conductor as input conductor in the first secondary substation and connected to the first distribution line;

a first current transformer connected to the first distribution line of medium voltage in a zone between the first secondary substation and the second secondary substation and able to detect current along the first distribution line of medium voltage;

a first voltage-measuring transformer connected to the first medium-voltage conductor and able to measure voltage entering the first secondary substation; and a first phasor measurement unit connected to an output of the first current transformer and to an output of the first voltage-measuring transformer;

the second secondary substation having a second medium-voltage conductor as input conductor in the second secondary substation and connected to the first distribution line;

a first voltage reducing apparatus connected to the second medium-voltage conductor; and a second phasor measurement unit connected to an outlet of the first voltage-reducing apparatus in the second secondary substation;

a receiving_processing unit suitable for receiving and processing data transmitted by the first phasor-measurement unit in the first secondary substation and data transmitted by the second phasor-measurement unit in the second secondary substation;

the system being configured to perform the following steps:

1a) the first phasor-measurement unit in the first secondary substation detecting at certain instants of time values of current of the first distribution line detected by the first current transformer in the same first secondary substation and transmitting relative data with relative time references to the receiving-processing unit;

1b) the first phasor-measurement unit in the first secondary substation detecting at certain instants of time which are the same instants of time of the step 1a) voltage values at the output of the first voltage-measuring transformer in the same first secondary substation and transmitting relative data with relative time references to the receiving_processing unit;

1c) the second phasor-measurement unit in the second secondary substation detecting in certain instants of time which are the same instants of time of the step 1a) voltage values at an output of the first voltage reducing apparatus in the second secondary substation and transmitting relative data with relative time references to the receiving-processing unit;

1d) the receiving_processing unit identifying and selecting among data received at least a first instant in time in which a value of current relative to the first distribution line detected by means of the first current transformer in the first secondary substation is lower than a first predetermined threshold value; and 1e) the receiving_processing unit processing one or more data received from the same receiving_processing unit and regarding the first instant of time in order to perform a calibration in relation to the first voltage reducing apparatus in the second secondary substation.

8. The system according to claim 7, wherein the system performs the steps of:

2a) the receiving_processing unit storing data transmitted by the first phasor-measurement unit and from the second phasor-measurement unit;

2b) the receiving_processing unit identifying and selecting from the received data at least a first instant of time in which the current value relating to the first distribution line detected by the first current transformer in the first secondary substation is lower than a predetermined first threshold value;

2c) the receiving_processing unit identifying among the received data concerning an output voltage with respect to the first voltage-measuring transformer in the first secondary substation in the same first instant of time identified and selected in point s.2*b*) above;

2d) the receiving_processing unit identifying among the received data concerning the output voltage with respect to the first voltage-reducing apparatus in the second secondary substation in the same first instant of time identified and selected in step 2b);

2e) the receiving_processing unit processing data identified in steps 2c) and 2d) regarding the first instant of time in order to perform a calibration in relation to the first voltage-reducing apparatus in the second secondary substation.

9. The system according to claim 7, wherein the system is configured to perform the step of:

3a) the receiving_processing unit comparing at least a first value relating to voltage at an outlet of the first voltage-reducing apparatus in the second secondary substation with at least a second value relating to voltage at an outlet of the first voltage-measuring transformer in the first secondary substation, the first value and the second value being related to the same instant in time.

10. The system according to claim 7, wherein the first predetermined threshold value is equal to zero.

11. The system according to claim 7, wherein the first predetermined threshold value is a value such to have a negligible effect due to voltage drop on the first distribution line.

12. The system according to claim 7, wherein the first predetermined threshold value is preferably a value having an effect due to voltage drop on the first distribution line having an entity equal to or less than ⅓ of a ratio error associated with an accuracy class of a voltage-reducing apparatus to be calibrated.

* * * * *